United States Patent Office 2,732,008
Patented Jan. 24, 1956

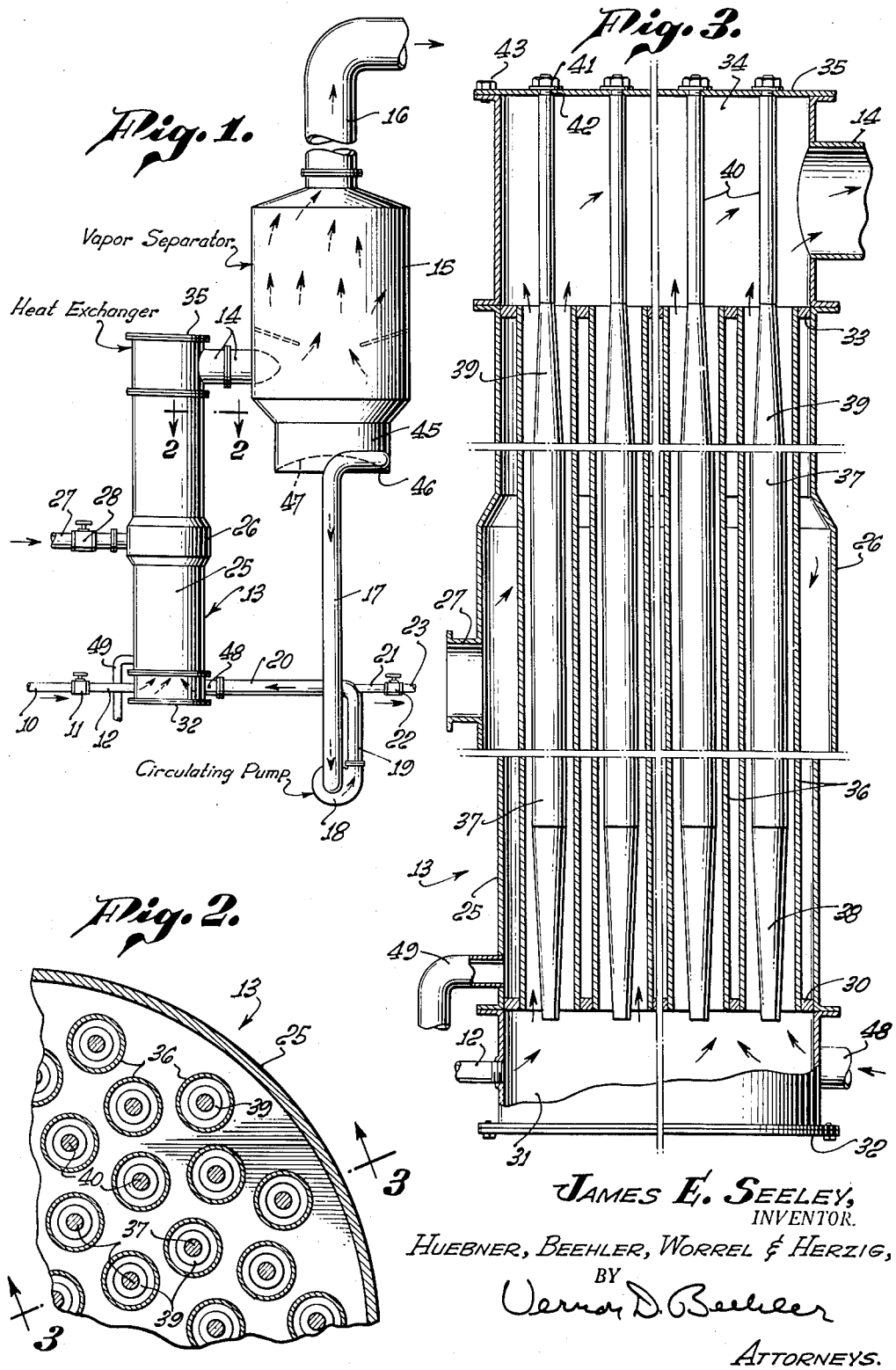

2,732,008

PROCESS OF LOW TEMPERATURE EVAPORATION

James E. Seeley, Long Beach, Calif., assignor to E. A. Silzle Corporation, Anaheim, Calif., a corporation of California Application December 8, 1951, Serial No. 260,703

4 Claims. (Cl. 159—1)

The invention relates to the evaporation of liquids at low temperatures and, although particularly directed to the concentration of aqueous solutions, may also be considered as related to the recovery of water vapor from a solution of water with other substances. As herein described the intention is particularly adapted to the concentration of fruit juices and especially citrus fruit juice.

Considerable attention has been given in recent years to the concentration of fruit juices and particularly citrus juices so that citrus juice, such as orange juice and grapefruit juice, can be shipped inexpensively from the growing areas to the markets. A variety of schemes have been resorted to for the concentration and preservation of fruit juices directed primarily to maintaining a natural flavor after canned, frozen or otherwise packed juices have been opened and made ready for consumption.

Various methods have been practiced in the past for concentrating juices. These practices, while productive of orange juice, for example, of low water content, have to a large extent been also productive of a cooked flavor in the resulting product sufficiently pronounced that the consuming public has not readily accepted those concentrated juices. Because of that lack of market acceptance, processors have resorted to lower temperatures in the evaporating process with the expectation of thereby eliminating the cooked flavor and attendant disadvantages of high temperature evaporation.

In employing low temperature evaporation techniques a number of disadvantages appear, especially where it has been deemed an absolute necessity to concentrate juice at temperatures below 80° F. Low temperatures require low pressures and low pressures require large tubes in the evaporator to cut down pressure drop. As a result, large tubes need to be operated as falling film evaporators to get low inventory and even with the falling film evaporator there is required tremendous amounts of recirculation. Hence inventory of the quantity of juice is increased as is also time of contact. Because of low velocities in falling film evaporation, heat transfer is poor and the equipment cost is high. Further, because vapors are taken off at temperatures below normal cooling water temperature, special equipment such as steam boosters or refrigeration must be used in order to condense the vapor which is taken off in the vaporizing portions of the cycle.

At low temperatures of evaporation below 80° F. there is little or no destruction of bacteria or enzymes and for this reason utmost care must be taken in the selection of fruit to be put through the process and in the sanitary technique employed while the operation is taking place.

It has further been observed that concentrate, made at the low temperatures above noted, when reconstituted by dilution with water to return it to approximately the initial concentration, experiences a rapid separation of the diluted concentrate into a clear serum toward the bottom and a heavy mass of pulp toward the top. This has been attributed by some to the fact that the pectin destroying enzymes are not inactivated. Moreover, when enzymes are still active, the viscosity of the final concentrate is very high and this in turn reduces heat transfer and increases equipment costs.

It is therefore among the objects of the invention to eliminate the disadvantages above recited.

Also among the objects of the invention is to provide a process for the concentration of juices so that the time of contact may be reduced making possible utilization of somewhat higher temperatures while at the same time, because of reducing the time of contact, the resulting product may maintain a more natural condition, the process being one contemplated to greatly improve the rate of concentration.

Included also among the objects is to provide a more efficient process of evaporation operating at a lower cost which includes a lower first cost for the plant as well as a lower cost of operation.

It is a further object of the invention to provide a new and improved method and apparatus therefor productive of a product in the nature of concentrated fruit juice having an improved color, a lower viscosity, a more uniform consistency from the sandpoint of cloud stability, and resulting in a product substantially equal to those heretofore produced by cold concentration.

It is also an object of the invention to provide a new and improved apparatus for the concentration of liquids and especially fruit juices at higher temperatures than were heretofore possible in producing natural tasting concentrates and at the same time providing a device wherein contact times may be held to a minimum in an apparatus which is sanitary and readily cleaned whenever necessity may arise.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a schematic view of an apparatus adapted to the practice of the method here involved.

Figure 2 is a cross-sectional view drawn to larger scale taken on the line 2—2 of Figure 1.

Figure 3 is a longitudinal sectional view shortened in length taken on the line 3—3 of Figure 2.

The drawings thus referred to are directed to an apparatus embodying the apparatus claims of the invention and one serving as an example of one form of apparatus in which the method herein disclosed and claimed may be performed to advantage.

It has been noted that in cooking vegetable substances advantageous results appear when the vegetable is cooked quickly and without permitting it to be heated to an especially high temperature. It has also been noted that when vegetable substances are cooked, they can be partially cooked for a period of time and then after cooling subjected again to heat and this repeated for a sufficient number of times to completely cook the substance without ever raising it to a high temperature such as would destroy many of the nutritive qualities of the substance being cooked.

It has been found furthermore that in the case of liquids if the liquid is held for but a short space of time in contact with relatively high temperatures and thereafter removed, the substance does not acquire a cooked flavor. To achieve such an effect in practice it has therefore been found that the liquid may be held in contact with heating surfaces relatively high in temperature for a short time only if the liquid is forced with sufficient pressure to drive it past the heat exchanger before any cooking actually takes place. Moreover, to employ this expedient in a practical form, it has furthermore been found most advantageous to pass the liquid over the heated surfaces in the form of a thin film, thin enough so that the heat imparted to it in the heat exchanging process may reach all portions of the liquid being heated very rapidly so that the portion of the film nearest the heated surface will not be heated to any appreciably greater degree than the portion of the liquid more remote within the film from the heated surface.

In the employment of these principles it has been found that where orange juice, for example, is to be processed in order to concentrate it to a product identified as a 60 Brix product, juice of the desired concentration may be evaporated at about 103° F. at a contact time of 40 seconds and under circumstances where the velocity of the liquid past the heated surfaces averages about 7.5 feet per second.

In a machine constructed for the purpose of making possible the practice of a method including the temperatures, times and velocities referred to, it has been found that tubes may be provided fitted with cores having a diameter sufficiently smaller so that a relatively thin film of liquid may pass between the inside wall of the tube and the outside wall of the core, which film is approximately ⅛ inch thick. When a nest or battery of tubes and cores thus formed have been employed together, it has been further found that a pump of relatively low capacity may be employed to force the liquid through the space between the cores and the interior surfaces of the tubes at a rate fast enough to inhibit the imparting thereto of a cooked flavor.

In the drawings there is illustrated an arrangement of units of an apparatus connected together in a manner suggestive of a flow diagram. These units, while conventional in some respects, have been modified in order to incorporate the novelly constructed heat exchanger unit embodied in this invention as well as to make possible the practice of the method herein disclosed.

In the drawings there is shown an inlet pipe 10 having a valve 11 therein and a short pipe from the valve to the bottom of a heat exchanger unit 13. The heat exchanger unit is connected by means of short pipes 14 to a vapor separator 15 having a vapor vent 16 at the top. At the bottom of the vapor separator is a concentrate line 17 which connects to the axis of a centrifugal circulating pump 18 which in turn sends the concentrate or concentrated juice through a pipe 19. From the pipe 19 a section thereof 20 is connected back to the lower end of the heat exchanger 13. A lead off pipe 21 smaller in diameter connects through a valve 22 to an outlet pipe 23 through which agency proportionate amounts of concentrated juice may be permitted to flow at a rate determined by the concentrating efficiency of the device as a whole.

Details of the heat exchanger 13 are shown in Figures 2 and 3. The heat exchanger is provided with a heated jacket 25 which has an enlarged portion 26 substantially midway between the top and the bottom. A steam inlet pipe 27 is used to conduct unsaturated steam at 212° F. into the jacket 25. A shut-off valve 28 is provided in the steam line.

At the bottom of the heat exchanger is an intake tube sheet or head 30 sealed at the edges so as to form an incoming liquid chamber 31. A plate 32 closes the bottom of the incoming liquid chamber. At the upper end of the jacket or heat exchanger is an outlet tube sheet or head 33 and above the outlet head is an outgoing liquid chamber 34 closed at the top by a plate 35.

Tubes 36 forming a series or nest of such tubes extend between the intake head 30 and the outlet head 33 forming passages for liquid from the incoming liquid chamber to the outgoing liquid chamber.

So that the passages may be of proper size, there are provided a series of cores 37. The core extends into the respective tube and is so sized that there remains a narrow space between the exterior wall of the core and the interior wall of the tube. It has been found in practice that tubes of 1 inch outside diameter having an inside diameter of about ⅞ inch supply a proper passage when cored by means of cores having an outside diameter of ⅝ inches. The passage therefore between the core and the tube is about ⅛ inch in breadth or thickness resulting in a film of liquid of corresponding thickness passing within the tubes.

To facilitate the flow of fluid through the passages thus formed and to minimize intake and outlet liquid losses, each of the tubes 17 is provided with a tapered portion 38 at the lower end and a similarly tapered portion 39 at the upper end.

The cores furthermore are in each case provided with extensions 40, the extensions being adapted to pass through the plate 35 to be there suspended by means of nuts 41. In order to more securely hold the cores in proper centered position in the plate 35, the upper ends of the tubes may be constructed with a shoulder portion 42 in each instance.

It will be noted that the cores are centered on precisely the same centers as are the tubes 36. When it may be desired to remove the cores, bolts 43 may be removed so as to free the plate 35 and then the plate with all of the attached cores 37 may be elevated by some suitable means so that the cores may be washed and also so that the interiors of the tubes may also be washed. When the cores are to be reinserted into the tubes 36, the lower tapered ends 38 of the cores facilitate manipulation of the cores into the respective tubes.

The vapor separator 15 may be of some conventional type and a type found successful in practice is one usually identified as a cyclone type. The vapor vent 16 is adapted to conduct vapor from the vapor separator to a suitable conventional condenser (not shown).

At the bottom of the vapor separator there may be provided a reservoir 45 into which the concentrated juice collects after some quantity of the water vapor has been separated therefrom. The concentrate line 17 has an upper horizontal portion 46 which is connected into the periphery of the reservoir 45, which in the example shown is equipped with a concave bottom 47. The concentrate line as heretofore described connects to the circulating pump 18 and then back through the section of pipe 20 to a nipple 48 at the side edge of the incoming liquid chamber 31.

In order to remove condensate from the jacket there is provided a condensate outlet line 49.

In the operation of a typical installation of an apparatus permitting the proper exercise of the method of the invention, steam may be introduced into the steam jacket at 212° F. in quantity of some 2060 pounds per hour. This quantity of steam would be suitable for use in a steam jacket large enough to accommodate about 87 one inch O. D. tubes having a length sufficient to permit travel therethrough of juice at a rate of not less than 5 feet to 7½ feet per second wherein the time of contact of the juice with the walls of the tubes for each passage does not exceed about one second under most circumstances, or three seconds under exceptional conditions.

In a typical apparatus of approximately that size single strength orange juice, for example, may be introduced into the inlet pipe and incoming liquid chamber 31 at the rate of about 319 gallons per hour and at average temperature which might readily be in the neighborhood of 70° F. The temperature of course might change depending on the outside temperatures.

The single strength orange juice passes from the incoming liquid chamber 31 upwardly as a film between the cores and the insides of the tubes to the outgoing liquid chamber 34. During passage the juice is heated to a temperature of about 115° to 117° F. which is the temperature of the juice in the outgoing liquid chamber 34.

During passage of the liquid from the incoming to the outgoing liquid chambers the liquid is forced at a rate not less than 5 feet per second but preferably at a rate of about 7½ feet per second. Because of the relatively thin film, namely, about ⅛ inch, the entire volume of juice is heated at a substantially uniform rate during the short time of its contact with the walls of the tubes 36.

The juice thus heated to from about 115° to 117° F. passes then to the vapor separator at which point the temperature drops so that the temperature of the vapor being separated from the heated juice lowers to about 101° F. The temperature of the remaining concentrated juice lowers to about 103° F. in the reservoir 45. It has been found in practice that the quantity of water vapor removed under the conditions indicated herein will be about 2000 pounds per hour.

The juice concentrate is preferably removed at the exterior circumference of the reservoir 45, which is the most advantageous point of removal, and then passes downwardly through the concentrate line 17 to the circulating pump 18. It is further found that the circulating pump works effectively at a rate of 200 gallons per minute under the conditions enumerated herein. As it passes from the circulating pump the concentrated juice or juice concentrate may be sampled by opening the valve 22 and by taking a measurement of the juice drawn therefrom. As the process continues, when the concentrate reaches a reading of 60 Brix as a measure of sugar content, the operating cycle will have reached a point where satisfactory continuous operation can be enjoyed.

To maintain continuous operation a substantial portion of the juice concentrate is passed back through the section of pipe 20 to the incoming liquid chamber where the concentrate is mixed with the single strength juice introduced through the inlet pipe 10, 12. Naturally the concentrate is reheated but reheating from a temperature of about 103° F. or perhaps as low as 100° F. is not sufficient to produce any undesirable flavor or taste; that is to say, raising the temperature again to 115° F. to 117° F. in the short length of time permitted the passage of the liquid mixture through the heat exchanger is not enough to cook the juice even though a part of the juice has already been raised to that temperature. From this it will be apparent that there is always a recirculation of a part of the concentrate mixed with the single strength juice newly introduced into the heat exchanger.

As a result of recirculation of the partly concentrated juice the same juice will pass through the heat exchanger a large number of times sufficient to raise the total contact time to about 30 to 40 seconds, although certain circumstances may permit as much as 60 seconds total contact time.

The value 22 may be manipulated at a rate such that juice concentrate passing the outlet pipe 23 is maintained at about 60 Brix. Once the continuous operation has been instituted, the valve 22 will be set so that the concentration remains substantially constant. A periodic check of the concentration should be made in order to assure that the continuous process is operating at a satisfactory rate. It has further been found that once the process has been started so that a concentrate of desired quality is drawn off, all of the temperatures will remain about the same and the production expected from the method practiced in an apparatus of about the size herein referred to will be in the neighborhood of 47 gallons per hour.

In a method of the type herein described a number of advantages are evident. For example, heat transfer coefficients are higher than those previously enjoyed for evaporative processes of this general nature, thus reducing evaporator equipment costs. When the vapor comes off at about 103° F. it is condensed in an ordinary barometric condenser. No steam boosters or refrigeration is necessary. Because of higher evaporation and lower contact time of the juice with the heating medium, a smaller pump can be relied upon for recirculation. It is, moreover, possible to use steam at atmospheric pressure thus eliminating the necessity for elaborate controls which would otherwise be necessary should super-heated steam be employed. By making the cores removable from the tubes, sanitation is greatly facilitated.

The product produced by the herein described method is superior in many respects to products produced by low temperature evaporation. For example, the color of the concentrate is superior to the color of concentrates heretofore secured by low temperature evaporation methods. The viscosity of the concentrate is also lower, thereby reducing pumping and mixing costs. It is furthermore noted that the concentrated juice when reconstituted, that is to say, mixed again with water at the point of consumption, does not separate into layers of clear serum and a pulpy mass after standing for some five days, a circumstance which was never experienced by other cold concentrates. The latter referred to attribute is an important one and is felt to be experienced because of at least a partial inactivation of the enzymes which destroy pectin, since it is well-known that the cloudiness or cloud stability of the reconstituted juice is a function of enzyme activity. It is also believed that there may be a substantial killing of bacteria, thereby enhancing the preservation of the resulting product. There consequently results from practicing the process a more acceptable concentrate at a considerable reduction in overall costs.

While I have herein shown and described my invention in what I have conceived to be the most practical and preferred embodiment, it is recognized that departures may be made therefrom within the scope of my invention, which is not to be limited to the details disclosed herein but it is to be accorded the full scope of the claims so as to embrace any and all equivalent devices and methods.

Having described my invention, what I claim as new and desire to secure by Letters Patent is:

1. A continuous process for the concentrating of juice at relatively low temperatures comprising forcing a supply of juice at about room temperature as a film over a heating medium for a period of a few seconds wherein the heating medium has a temperature not greater than about 212° F., discharging the heated juice at a temperature about 45° higher than its initial temperature into a vapor separator, drawing off released water vapor in a generally upward direction, drawing off juice concentrated by extraction of water in a generally downward direction, recirculating a portion of said concentrated juice into the incoming juice during passage of the incoming juice to the heating medium and tapping off another portion of the concentrated juice when the concentrate reaches a predetermined degree of concentration.

2. A continuous process for the separation at relatively low temperatures of water from a solution of water and dissolved solids comprising supplying a flow of the solution at a controllable rate, forcing the solution as a film for periods of about one second over a heating medium wherein the heating medium has a temperature not greater than about 212° F., discharging the heated solution at a temperature of about 45° F. higher than its initial temperature into a vapor separator, drawing off released water vapor in a generally upward direction, drawing off solution concentrated by extraction of water in a generally downward direction, recirculating a portion of said concentrated solution into the incoming unconcentrated solution during passage of the unconcentrated solution to the heating medium thereby raising the total contact period of the juice with the heating medium to about 30 to 60 seconds and tapping off another portion of the concentrated solution when the concentrated solution reaches a predetermined degree of concentration at a rate controlled to maintain the predetermined degree of concentration.

3. A continuous process for the concentrating of citrus juice at relatively low temperatures comprising supplying a flow of unconcentrated juice at a controllable rate and at a temperature of about 70° F., forcing the juice as a film for a period not to exceed one second over a heating medium wherein the heating medium has a temperature not greater than about 212° F., discharging the heated juice into an unheated chamber at a temperature of about 117° F., passing the juice to a cyclone type vapor separator, drawing off released water vapor in a generally upward direction, drawing off residual juice concentrate at the bottom of the separator in a generally outwardly and then downwardly direction, recirculating a portion of said juice concentrate into the incoming unconcentrated juice during passage of the unconcentrated juice to the heating medium, and tapping off another portion of the juice concentrate when the concentrate reaches a predetermined Brix measurement and at a rate controlled to maintain the predetermined Brix measurement.

4. A continuous process for concentrating juice at a relatively low temperature by use of a heat exchanger, vapor separator and recirculating pump interconnected in series comprising introducing natural juice at about room temperature and under pressure into the heat exchanger at a low end thereof, forcing the juice as a film of about ⅛ inches in thickness at a rate of about 7½ feet per second over a heating medium in the exchanger wherein the heating medium is at about 112° F. and wherein the juice is in contact with the heating medium for not more than about one second, discharging juice heated by the heat exchanger from the heat exchanger at from about 115° F. to 117° F., then passing said heated juice to the vapor separator, drawing off released water vapor from the vapor separator at about 101° F., drawing off juice concentrate from the vapor separator at a lower side periphery at about 103° F., pumping a portion of said juice concentrate at from about 100° F. to 103° F. into the low end of the heat exchanger and mixing the juice concentrate at said low end with incoming natural juice, and tapping off juice concentrate at the high pressure side of the pump after the juice concentrate has reached a selected degree of concentration at about 60 Brix and at a rate controlled to maintain said degree of concentration.

References Cited in the file of this patent

UNITED STATES PATENTS

| | | |
|---|---|---|
| 965,388 | Kestner | July 26, 1910 |
| 995,776 | Dunn | June 20, 1911 |
| 1,265,863 | Abbott, Jr. | May 14, 1918 |
| 1,438,502 | Peebles | Dec. 12, 1922 |
| 1,940,070 | Barry et al. | Dec. 19, 1933 |
| 2,562,495 | Hulme | July 31, 1951 |
| 2,570,212 | Cross | Oct. 9, 1951 |
| 2,628,168 | Madsen | Feb. 10, 1953 |

FOREIGN PATENTS

| | | |
|---|---|---|
| 28,711 | Great Britain | Dec. 31, 1903 |